(12) United States Patent
Kobayashi (10) Patent No.: US 6,650,508 B2
(45) Date of Patent: Nov. 18, 2003

(54) POSITIONING MECHANISM FOR INFORMATION STORAGE APPARATUS AND CARRIAGE

(75) Inventor: Hiroki Kobayashi, Kawasaki (JP)

(73) Assignee: Fujitsu Limited, Kawaski (JP)

( * ) Notice: Subject to any disclaimer, the term of this patent is extended or adjusted under 35 U.S.C. 154(b) by 169 days.

(21) Appl. No.: 09/772,096

(22) Filed: Jan. 26, 2001

(65) Prior Publication Data
US 2001/0053049 A1 Dec. 20, 2001

(30) Foreign Application Priority Data
Jun. 20, 2000 (JP) ........................................ 2000-184911

(51) Int. Cl.[7] ................................................. G11B 5/48
(52) U.S. Cl. ..................... 360/266.6; 369/244
(58) Field of Search .......................... 360/266.6, 266.8, 360/266.7, 264.8, 264.9; 369/244, 249

(56) References Cited

U.S. PATENT DOCUMENTS

| | | | | |
|---|---|---|---|---|
| 5,388,086 A | * | 2/1995 | Yamasaki et al. | 359/814 |
| 5,663,843 A | | 9/1997 | Ezawa et al. | 359/824 |
| 6,351,445 B1 | * | 2/2002 | Ng et al. | 369/219 |

* cited by examiner

Primary Examiner—George J. Letscher
(74) Attorney, Agent, or Firm—Greer, Burns & Crain, Ltd.

(57) ABSTRACT

There is disclosed an information storage apparatus in which movement of a carriage is smooth, and precision of a recording reproduction position is high. Both a gravity center G of a carriage 120, and an application point H at which a slider 126 receives a force exist inside a triangle T whose respective vertexes are formed by a first support member 122 and second support members 123, 124.

3 Claims, 10 Drawing Sheets

POSITIONING MECHANISM FOR INFORMATION STORAGE APPARATUS AND CARRIAGE

BACKGROUND OF THE INVENTION i) Field of the Invention

The present invention relates to an information storage apparatus for performing at least information reproduction via a carriage moving along a predetermined information storage medium with respect to the information storage medium, and the carriage.

ii) Description of Related Art

As an information storage apparatus for holding an information storage medium inside, and performing information recording or information reproduction with respect to the information storage medium, a hard disk drive, a CD drive, a magnetic optical disk drive, and the like have heretofore been known. Such information storage apparatuses are utilized as an external storage apparatus of a computer, and the like in a broad field.

The information storage apparatus is provided with read/write means for writing information into a desired position of the information storage medium, or reading the information from the desired position of the information storage medium. The read/write means is referred to as a magnetic head in a magnetic disk drive represented by a hard disk drive, and as an optical pickup in an optical disk drive represented by a CD drive.

In the conventional magnetic disk drive, a slider for contacting or approaching the surface of the information storage medium is attached to a tip end of an arm rotating in a parallel plane with respect to the information storage medium surface, and the magnetic head is generally mounted on the slider.

Moreover, in the conventional optical disk drive, the optical pickup is divided into a fixed portion provided with a laser diode and a photodetector and a movable portion (carriage) moving on a rail extending along the information storage medium surface, and a lens for focusing a laser light onto the information storage medium surface, and the like are generally mounted on the carriage.

In recent years, with rapid development of a computer, and with an increasing demand for handling of large data such as an image, rapid enhancement of information storage density has been demanded, and accordingly precision enhancement of a recording reproduction position has also been demanded. Moreover, as read/write means for satisfying both the enhancement of storage density and the enhancement of position precision, there is proposed read/write means constituted by attaching the slider to the carriage via a leaf spring or the like, and mounting the magnetic head or the lens on the slider.

Additionally, in the information storage apparatus, in order to enable high-speed access, in general, a disk information storage medium is used, the information storage medium is rotated by a motor at a high speed, and an air flow is generated in the vicinity of the information storage medium surface. Moreover, since a force received by the slider by the air flow is large enough to exceed own weight of the entire carriage, it is expected to be difficult to smoothly move the carriage along the rail simply by using the carriage used in the conventional optical disk drive. Therefore, there is a high possibility that the carriage position precision, that is, the recording reproduction position precision becomes insufficient.

SUMMARY OF THE INVENTION

The present invention has been developed in consideration of the aforementioned situations, and an object thereof is to provide an information storage apparatus which has a high precision of a recording reproduction position, and a carriage which realizes the information storage apparatus. When the information storage apparatus high in the precision of the recording reproduction position is realized, this largely contributes to rapid enhancement of a recording density of the information storage apparatus.

To achieve the aforementioned object, according to the present invention, there is provided an information storage apparatus for performing at least information reproduction via a carriage moving along a predetermined information storage medium with respect to the information storage medium.

The information storage apparatus comprises a rail extending along the information storage medium.

The carriage comprises three or more support members for supporting the carriage with respect to the rail, and a slider for contacting or approaching the surface of the information storage medium, and both a gravity center of the carriage and an application point of a force received by the slider by contacting or approaching the surface of the information storage medium exist inside a polygon whose vertexes are formed by the respective support members as seen from the information storage medium.

According to the information storage apparatus of the present invention, since both the carriage gravity center and the application point of the force received by the slider exist inside the polygon, the carriage is always dynamically stable. Therefore, the carriage can smoothly move along the rail, and a sufficient recording reproduction position precision can be obtained.

Moreover, preferably the information storage apparatus of the present invention "further comprises an actuator for driving the carriage along the rail, and when a height is defined by a distance from the surface of the information storage medium, the height of a position obtained by weighting and averaging respective positions using a friction resisting force generated in the position of the support member contacting the rail as a weight, the height of the gravity center of the carriage, and the height of the application point of a driving force of the actuator applied to the carriage are the same height".

In order to smoothly move the carriage along the rail at a high speed, it is desirable to devise the position in which the driving force for driving the carriage is applied to the carriage. According to the information storage apparatus provided with the actuator, since the driving force is applied to the application point, the carriage can smoothly be moved along the rail at the high speed. As a result, the information storage apparatus high in the recording reproduction position precision and fast in the recording reproduction speed is realized.

To achieve the aforementioned object, according to the present invention, there is provided a carriage comprising:

a slider for contacting or approaching a predetermined information storage medium surface; and three or more support members for supporting the carriage, Wherein both an application point of a force received by the slider by contacting or approaching the information storage medium surface, and a gravity center of the carriage exist inside a polygon whose vertexes are formed by the respective support members as seen from the information storage medium.

DETAILED DESCRIPTION OF THE PREFERRED EMBODIMENTS

A comparative example will first be described, and an embodiment of the present invention will next be described. Additionally, for the comparative example, only a periphery of a carriage will be described.

Figure 1:
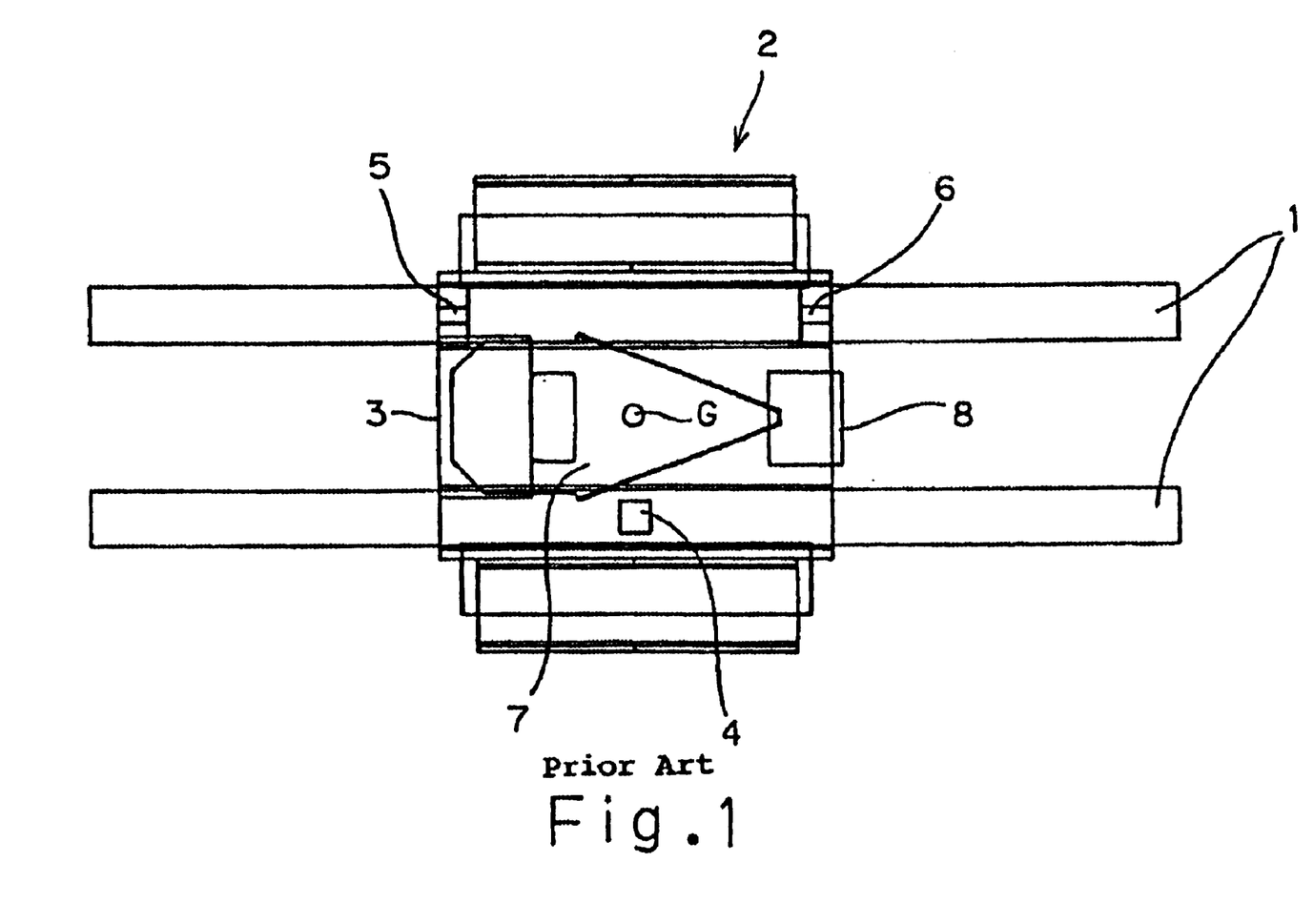
FIG. 1 is a diagram showing a first comparative example.
Figure 2:
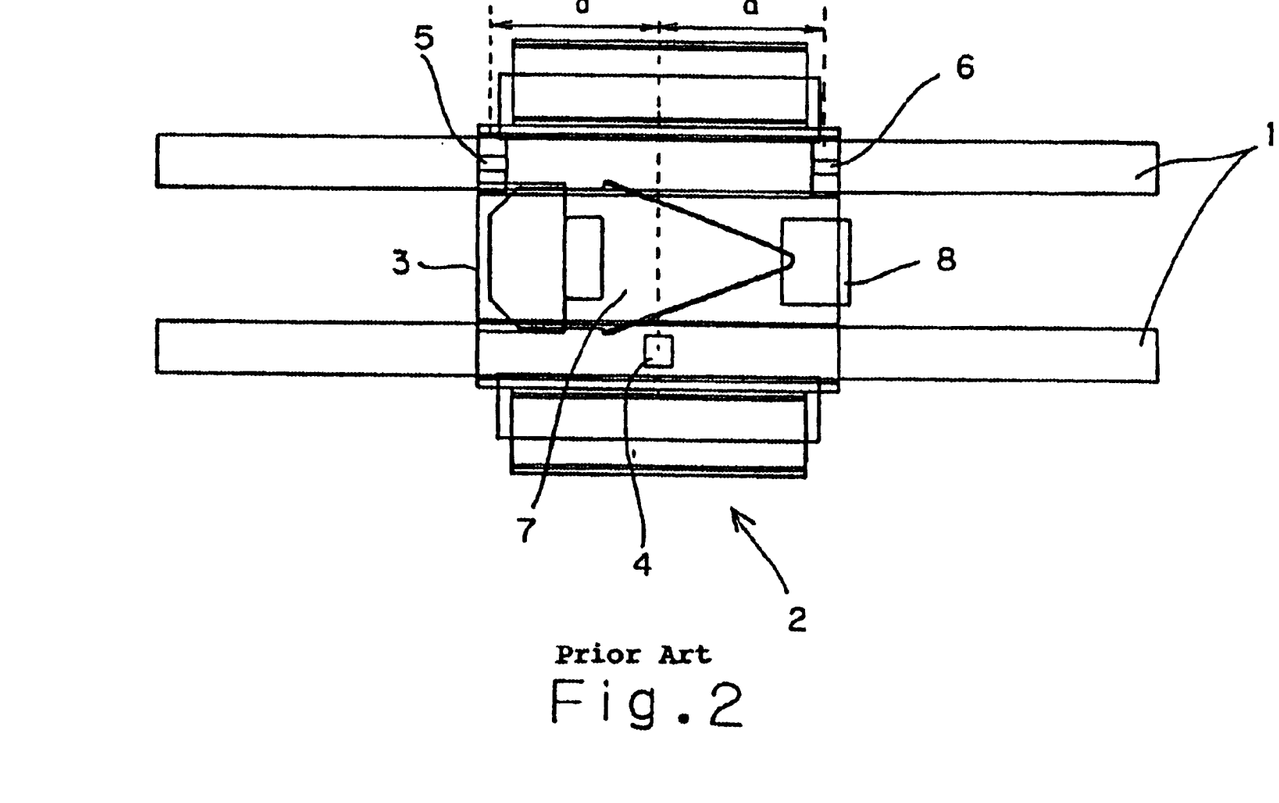
FIG. 2 is a diagram showing a second comparative example.

FIG. 1 is a diagram showing a first comparative example, and FIG. 2 is a diagram showing a second comparative example.

FIGS. 1 and 2 show a state of the carriage periphery seen from the side of an information storage medium (not shown). Two round rod-shaped rails 1 extend in parallel to an information storage medium surface.

A carriage 2 is provided with a rectangular parallelepiped main body 3 extending over the two rails 1, a first support member 4 for contacting one point of the rail 1 to support the main body 3, and two second support members 5, 6 for contacting two points of the rail 1 to support the main body 3. Moreover, the carriage 2 is provided with a tapered leaf spring 7 whose root is attached to the main body 3, and a slider 8 attached to the tip end of the leaf spring 7, and the slider 8 is disposed with a remarkably slight distance from and in the vicinity of the information storage medium surface.

The respective first support member 4 and second support members 5, 6 slidably contact the rails, and the carriage is supported by the first support member 4 and second support members 5, 6 to move on the rails 1. When all the first support member 4 and second support members 5, 6 contact the rails 1, the carriage 2 smoothly moves. The two second support members 5, 6 are disposed in two corners on one side of the main body 3, and the first support member 4 is disposed on the other side of the main body 3. In the first comparative example shown in FIG. 1, the first support member 4 is disposed in a direction vertical to the rails 1 with respect to a gravity center G of the carriage 2. Moreover, in the second comparative example shown in FIG. 2, the first support member 4 is disposed in the direction vertical to the rails 1 with respect to a midpoint between two second support members 5, 6.

The first support member 4 and second support members 5, 6 are disposed in these positions, and the carriage 2 therefore smoothly moves on the rails 1 as long as no external force is applied to the carriage 2.

However, as described above, the slider 8 receives a very large force from an information storage medium side (front side of the drawing) because of high-speed rotation of the information storage medium. As a result, the carriage 2 tilts toward the slider 8, or vibration or the like occurs, and smooth movement becomes difficult.

In consideration of the aforementioned problems, an embodiment of the present invention will be described hereinafter.

Figure 3:
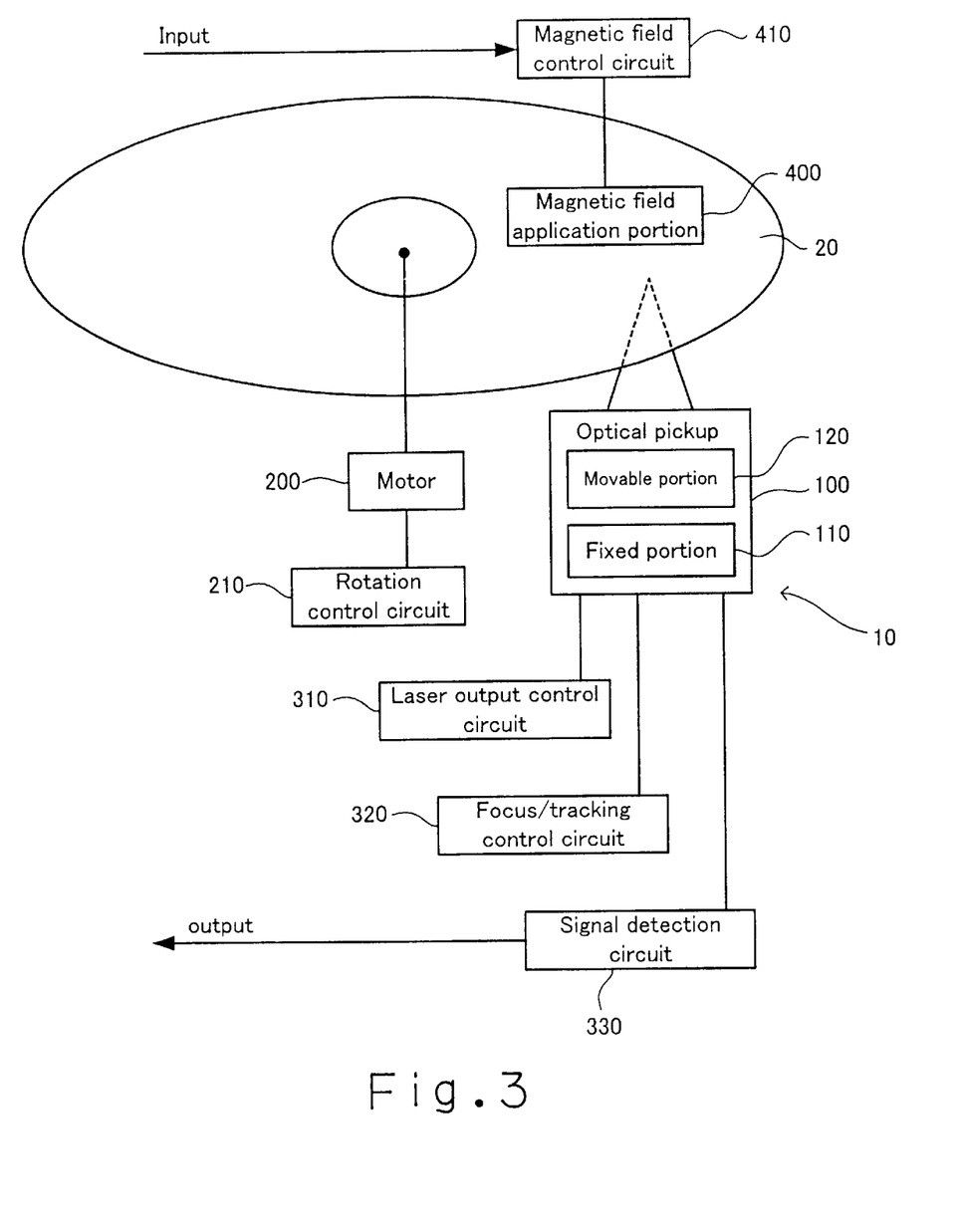
FIG. 3 is a diagram showing one embodiment of an information storage apparatus of the present invention.

FIG. 3 is a diagram showing one embodiment of an information storage apparatus of the present invention.

An information storage apparatus 10 is provided with an optical pickup 100 for irradiating a magnetic optical disk 20 as one example of an information storage medium referred to in the present invention with a laser light to perform information reproduction and information recording. The optical pickup 100 is constituted of a fixed portion 110 in which a laser diode and a photodetector are incorporated, and a movable portion (carriage) 120 for irradiating the magnetic optical disk 20 with the laser light emitted from the laser diode of the fixed portion 110 and guiding a reflected light from the magnetic optical disk 20 to the photodetector of the fixed portion 110. The movable portion (carriage) 120 is one embodiment of the carriage of the present invention. Details of the carriage 120 will be described later.

Moreover, the optical information storage apparatus 10 is provided with a motor 200 for holding and rotating the magnetic optical disk 20, a rotation control circuit 210 for controlling motor rotation, a laser output control circuit 310 for controlling an output of the laser light emitted by the optical pickup 100, and a focus/tracking control circuit 320 for controlling focus and tracking of laser light irradiation by the optical pickup 100.

Furthermore, the optical information storage apparatus 10 is provided with a magnetic field application portion 400, and a magnetic field control circuit 410, and during information writing, an external magnetic field is applied to a collection position of the irradiation light by the optical pickup 100 by the magnetic field application portion 400. Strength, direction, and the like of the external magnetic field applied by the magnetic field application portion 400 are controlled by the magnetic field control circuit 410 in response to an input signal indicating write information to be written into the magnetic optical disk 20. Subsequently, the write information is written into the magnetic optical disk 20 by heat of the irradiation light by the optical pickup 100 and the external magnetic field by the magnetic field application portion 400. As the magnetic field application portion 400, concretely an electromagnet or a magnetic head is used.

Additionally, the optical information storage apparatus is provided with a signal detection circuit 330, and during information reproduction, the signal detection circuit 330 detects and outputs a signal indicating the information stored in the magnetic optical disk 20 from a detect signal outputted from the photodetector of the fixed portion 110 of the optical pickup 100.

Figure 4:
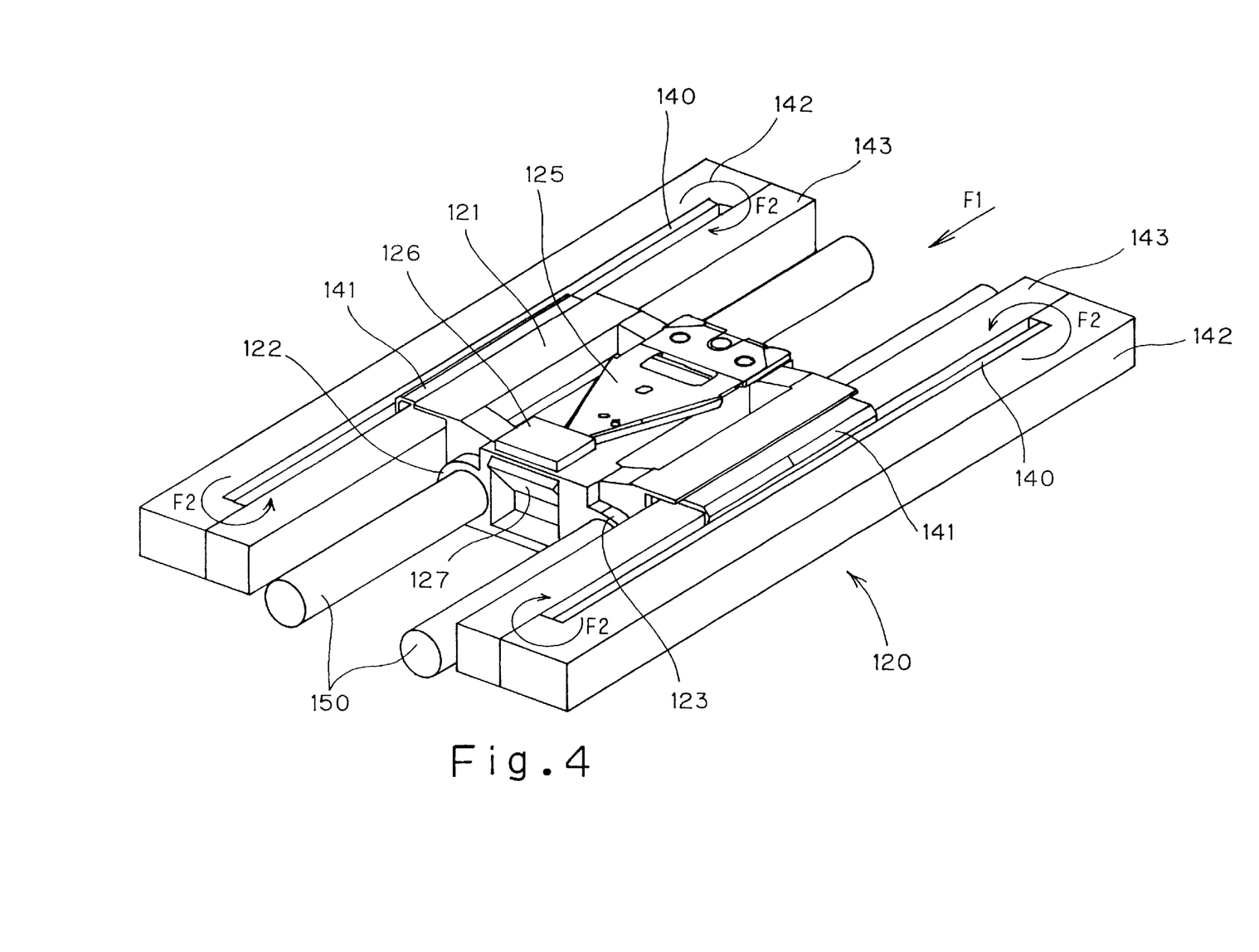
FIG. 4 is a perspective view showing one embodiment of a carriage of the present invention.
Figure 5:
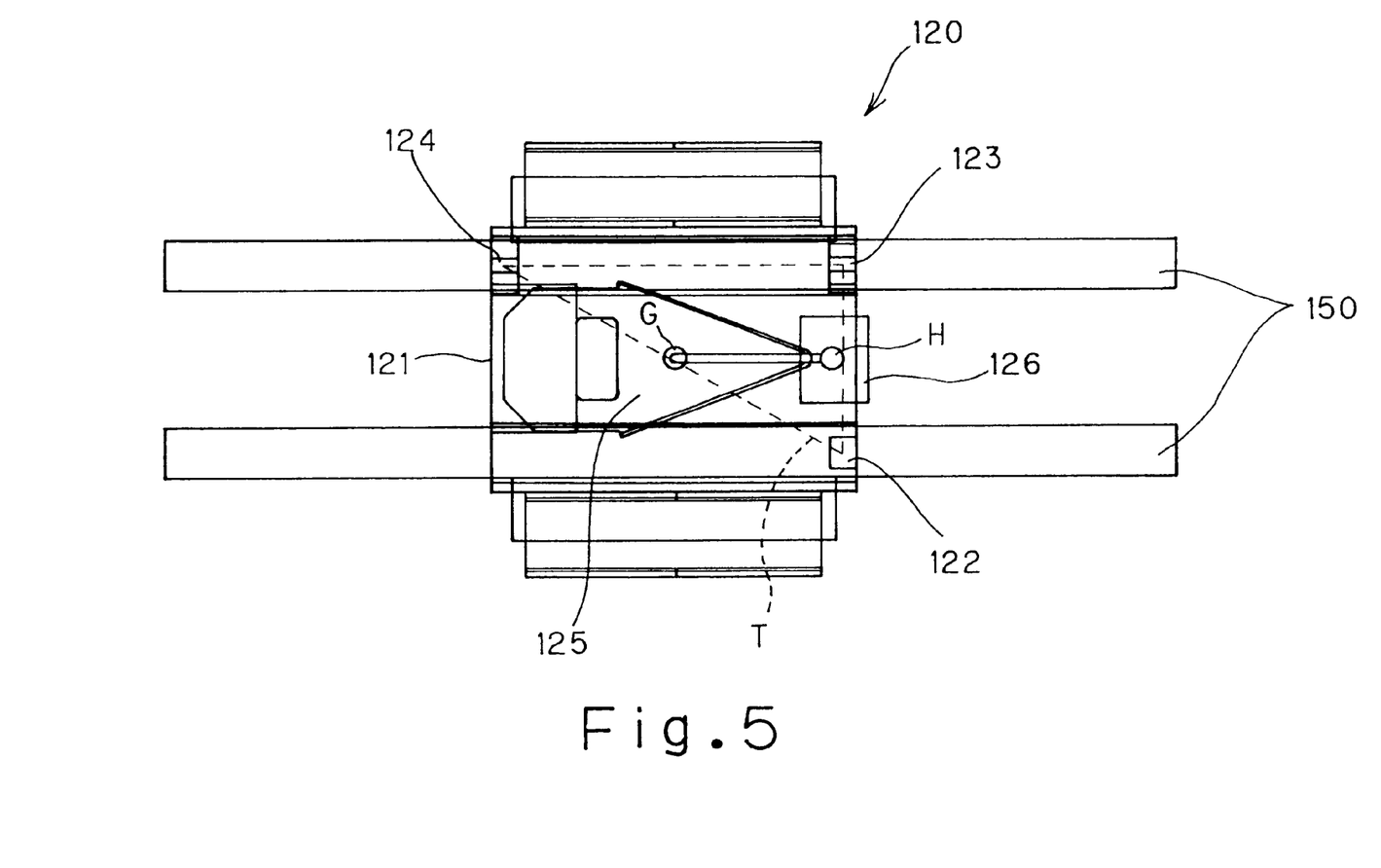
FIG. 5 is a plan view showing one embodiment of the carriage of the present invention.
Figure 6:
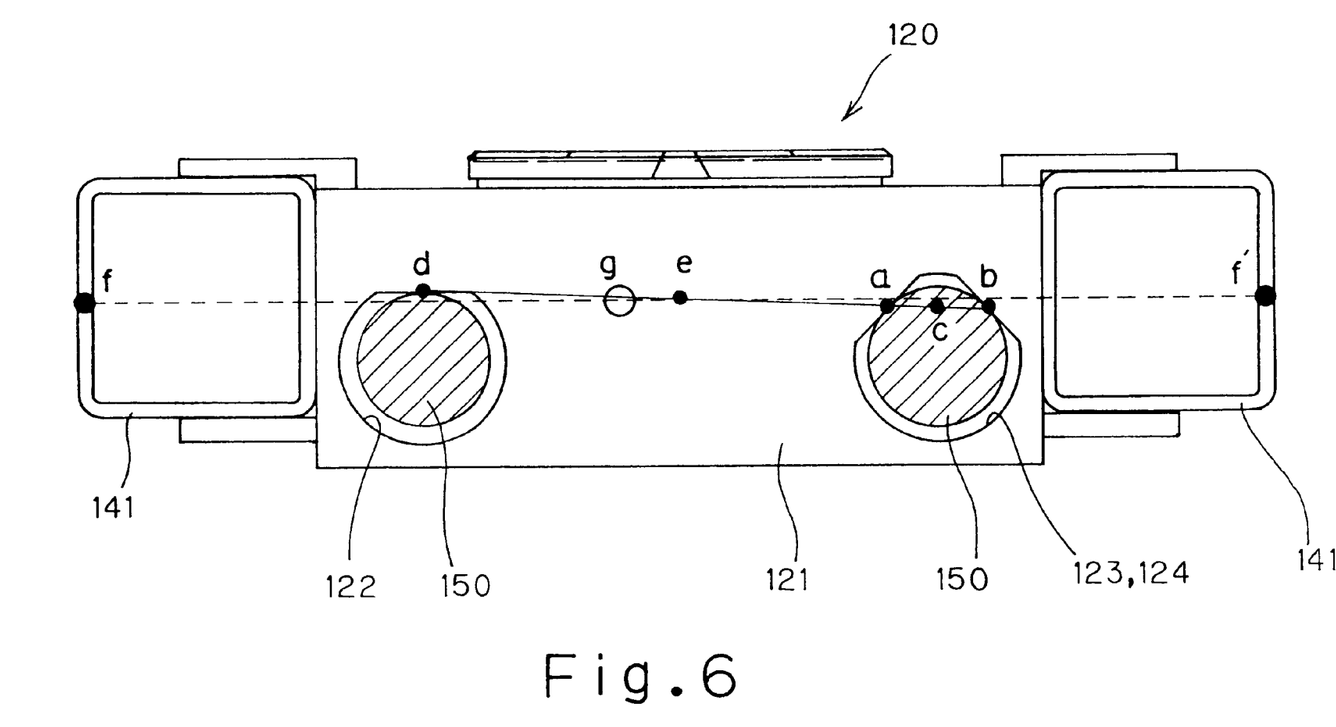
FIG. 6 is a sectional view showing one embodiment of the carriage of the present invention.

FIG. 4 is a perspective view of a carriage 120 shown by one square in FIG. 3, FIG. 5 is a plan view, and FIG. 6 is a sectional view.

The carriage 120 shown in FIGS. 4 to 6 is provided with a main body 121 extending over two columnar rails 150, a first support member 122 for contacting the rail 150 by a point d shown in FIG. 6 to support the main body 121, and two second support members 123, 124 for contacting the rail 150 by two points a, b shown in FIG. 6 to support the main body 121. The first support member 122 and second support members 123, 124 are provided with a ring-shaped structure to surround the rails 150, and a ring inner surface contacts the surface of the rail 150 by the respective points a, b, d.

Moreover, the carriage 120 is provided with a tapered leaf spring 125 whose root is attached to the main body 121, and a slider 126 attached to the tip end of the leaf spring 125. The laser light is incident upon the carriage 120 from a direction of an arrow F1 shown in FIG. 4, and the laser light is reflected by a reflection mirror 127 to turn to the slider 126. A focusing lens (not shown) is mounted of the slider 126, and the laser light reflected by the reflection mirror 127 is focused onto the information storage medium surface (not shown).

The slider 126 is disposed with a slight distance from and in the vicinity of the information storage medium surface, and receives a large force generated from the high-speed rotation of the information storage medium as described above.

In the carriage 120, as shown in FIG. 5, both the gravity center G of the carriage 120 and an application point H of a force received by the slider 126 exist in a triangle T whose respective vertexes are formed by the first support member 122 and two second support members 123, 124. Therefore, irrespective of a magnitude of the force applied to the application point H, the carriage 120 is dynamically steadily supported by the first support member 122 and two second support members 123, 124, and all the first support member 122 and two second support members 123, 124 are always in contact with the rails 150. Therefore, the movement of the carriage 120 along the rails 150 is smooth, and position precision of information recording reproduction is high.

Figure 7:
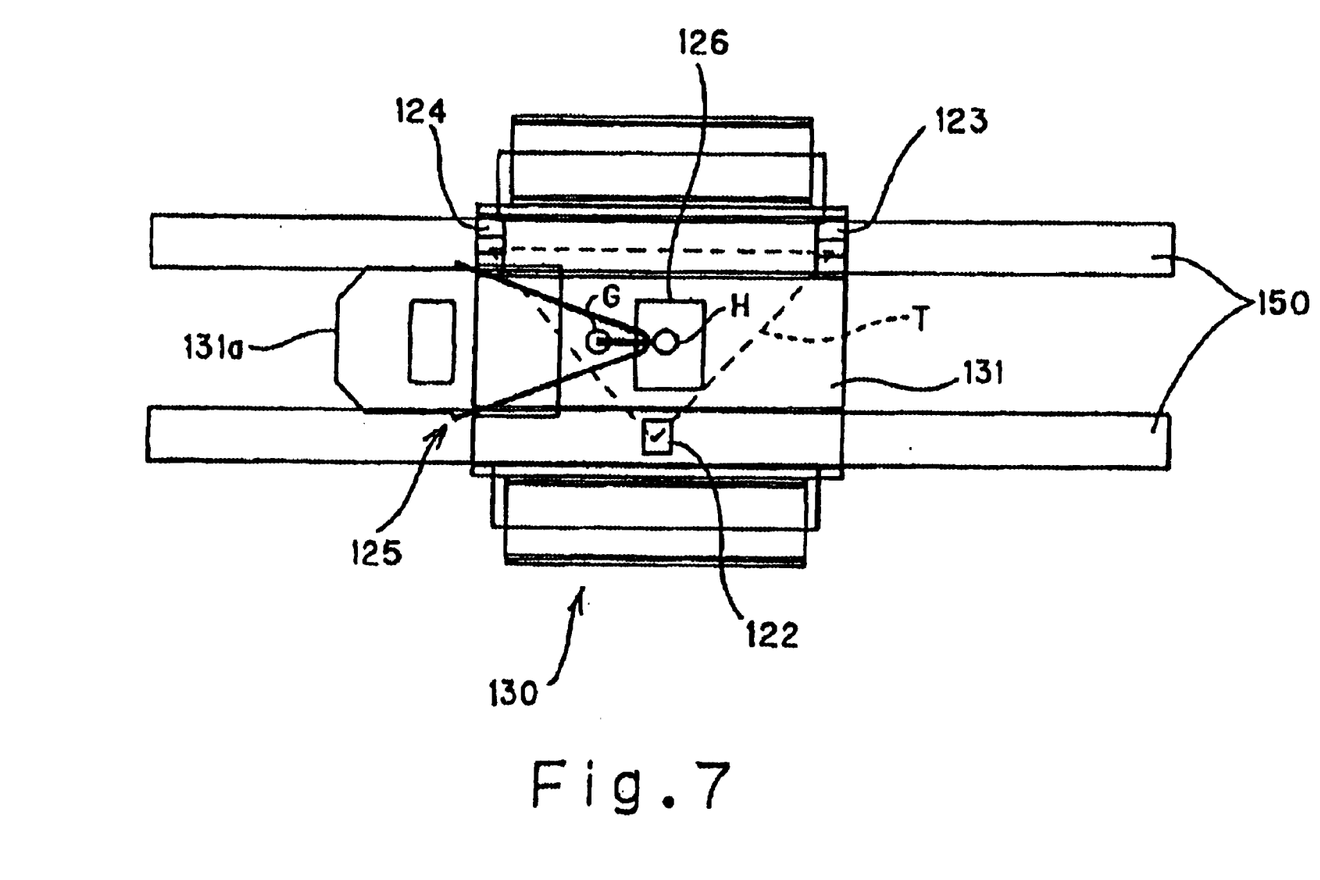
FIG. 7 is a plan view showing another embodiment of the carriage of the present invention.

FIG. 7 is a plan view showing another embodiment of the carriage of the present invention.

A main body 131 of a carriage 130 is provided with an overhang 131a to which the leaf spring 125 is attached. Since the root of the leaf spring 125 is attached to the overhang 131a, both the gravity center G of the carriage 130 and the application point H of the force received by the slider 126 are positioned in the vicinity of the center of the main body 131. Moreover, the first support member 122 and two second support members 123, 124 are disposed in such a manner that both the gravity center G and the application point H are within the triangle T defined by the first support member 122 and two second support members 123, 124 forming the respective vertexes. Therefore, similarly as the carriage 120 shown in FIGS. 4 to 6, the carriage 130 shown in FIG. 7 is also constantly dynamically steadily supported by the first support member 122 and two second support members 123, 124, the movement of the carriage 130 along the rails 150 is smooth, and the position precision of information recording reproduction is high.

Additionally, FIG. 4 shows two magnets 140 fixed in parallel to the rails 150, two coils 141 attached to both sides of the carriage 120, and yokes 142, 143 for guiding a magnetic force line of the magnetic field generated by the magnet 140, and these constitute one example of an actuator for driving the carriage 120. For magnetic poles of the magnets 140, one of both poles turns to the carriage 120, and the other turns to a direction opposite to the carriage 120.

Moreover, the yokes 142, 143 guide the magnetic force lines of the magnetic fields generated by the magnets 140 as shown by arrows F2 of FIG. 4 to concentrate the magnetic fields to the coils 141. Furthermore, when current flows through the coil 141, the driving force is generated, and the carriage 120 is moved along the rail 150.

When the information storage apparatus accesses the information storage medium at a high speed, high-speed movement of the carriage 120 is necessary, and the aforementioned actuator needs to generate a large driving force. In general, when the large driving force is applied to the carriage 120, because of an inertia resisting force of the carriage 120 and a friction resisting force between the support member and the rail, the carriage 120 causes tilting or vibration, and smooth movement is easily prevented. Therefore, to smoothly move the carriage 120 even during high-speed movement, in the present embodiment, as described later, the position of the application point to which the actuator driving force is applied is devised.

As described above, the first support member 122 contacts the rail 150 at the point d shown in FIG. 6, and the second support members 123, 124 contact the rail 150 at two points a, b. Therefore, the carriage 120 is supported by five points in total with respect to the rails 150, and during driving of the carriage 120, respective friction resisting forces are generated in these five points. A point e shown in FIG. 6 is a midpoint e between a midpoint c of two points a, b and the point d, and indicates a position obtained by using the friction resisting forces generated in the respective five points for supporting the carriage 120 as weights to weight and average respective five point positions.

In FIG. 6, a plane passed through the point e and in parallel to the information storage medium surface is shown by a dotted line, and a gravity center g of the carriage and application points f, f' of the driving forces by the actuator exist on the plane. Specifically, the midpoint e, gravity center g and application points f, f' are arranged at the same height from the information storage medium surface. When the actuator driving force is applied to the application points f, f', the driving force by the actuator acts at the same height as the height of the inertia resisting force of the carriage 120 and friction resisting force, the tilting and vibration of the carriage 120 are avoided, and the carriage 120 can smoothly move even during high-speed movement.

Additionally, when the magnetic field is utilized for information recording or information reproduction, and when the magnetic field caused by the aforementioned actuator leaks and reaches the recording reproduction position, an error is caused during information recording or reproduction. Therefore, a countermeasure against the leak magnetic field is preferably applied.

Figure 8:
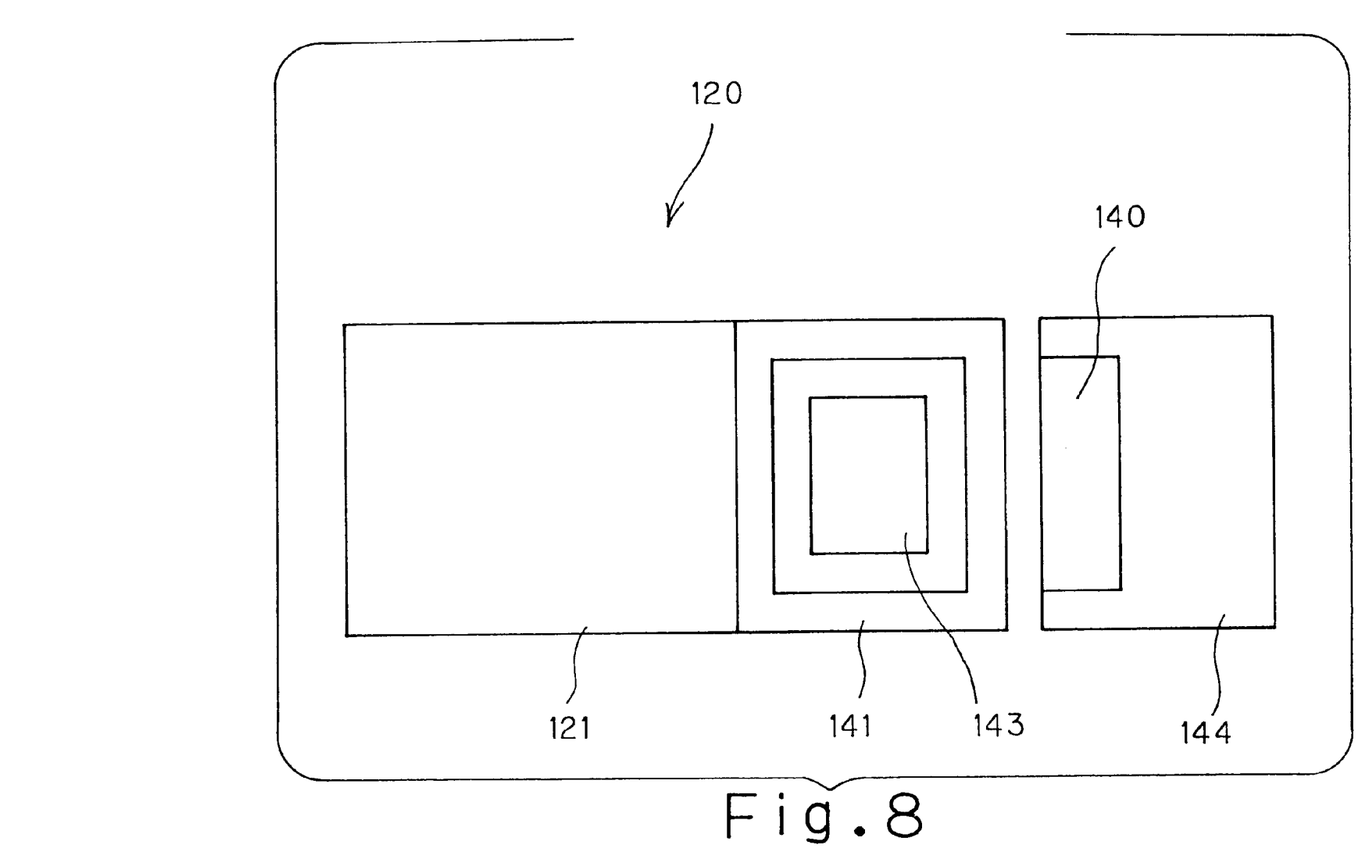
FIG. 8 is a sectional view of an embodiment in which a countermeasure is applied to a leak magnetic field.

FIG. 8 is a sectional view of an embodiment in which the countermeasure is applied to the leak magnetic field.

The embodiment is similar to the embodiment shown in FIGS. 4 to 6 except that a yoke shape is devised. FIG. 8 shows a periphery of the magnet 140.

As described above, the coil 141 constituting the actuator is attached to the main body 121 of the carriage 120. Moreover, the actuator is provided with yokes 143, 144 for guiding the magnetic force lines of the magnetic fields to concentrate the magnetic field of the magnet 140 onto the coil 141. Here, as the countermeasure against the leak magnetic field, an information storage medium side (vertical side of the drawing) of the magnet 140 is covered with the yoke 144, and the magnetic force line directed to the information storage medium from the magnet 140 is cut off.

Therefore, the leak magnetic field is weak, and the error during information recording and information reproduction is little.

Figure 9:
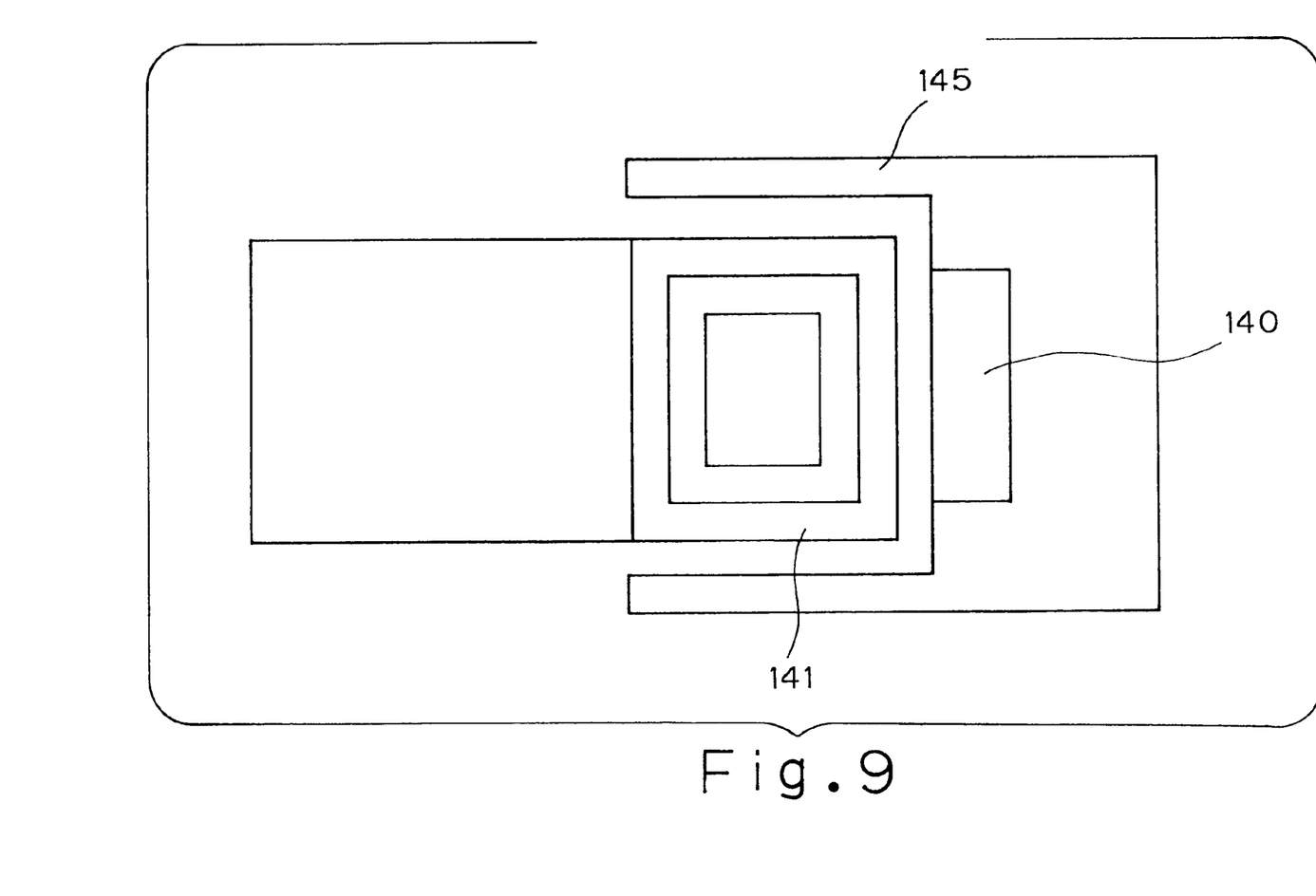
FIG. 9 is a sectional view of another embodiment in which the countermeasure is applied to the leak magnetic field.

FIG. 9 is a sectional view of another embodiment in which the countermeasure is applied to the leak magnetic field.

In this embodiment, instead of the yoke 144 shown in FIG. 8, a yoke 145 is also disposed to cover not only the information storage medium side (vertical side of the drawing) of the magnet 140 but also the information storage medium side of the yoke 141. Therefore, in the embodiment shown in FIG. 9, the leak magnetic field is weaker than that in the embodiment shown in FIG. 8.

Figure 10:
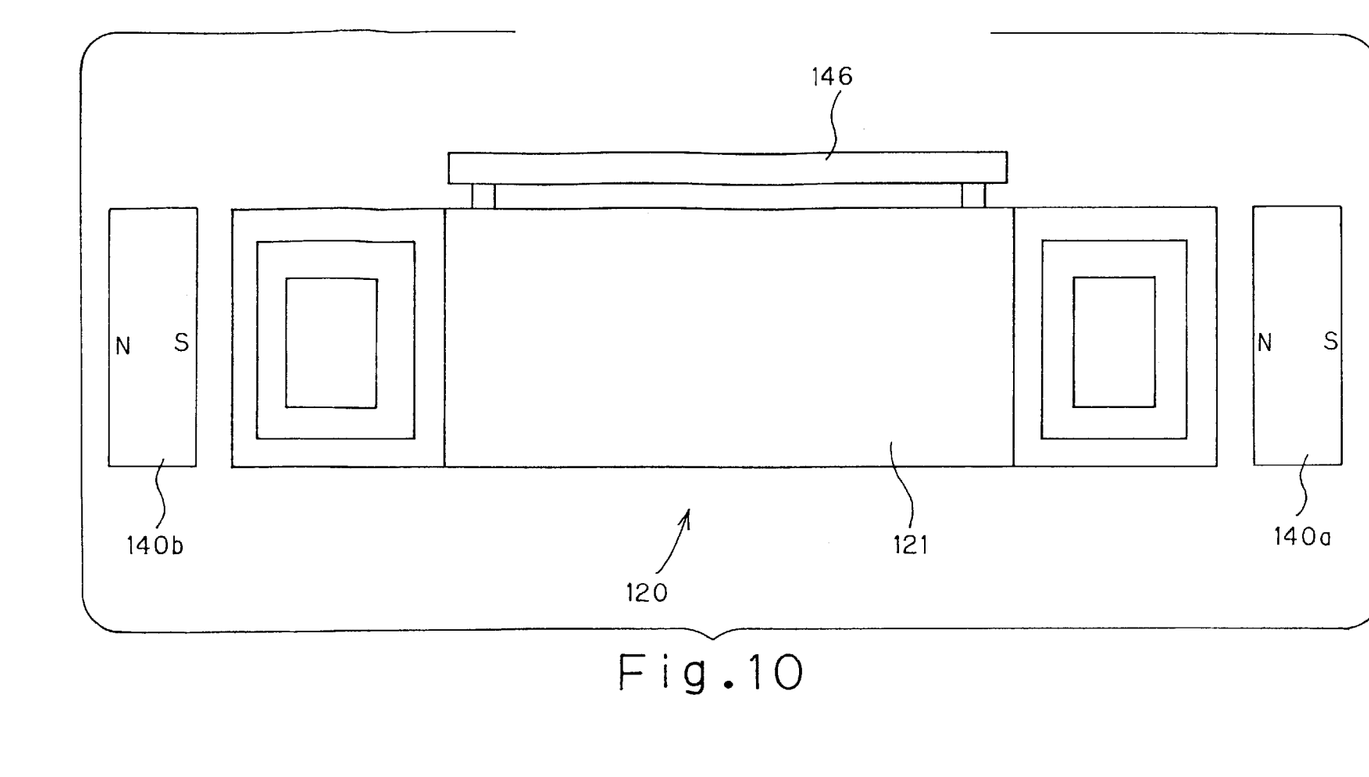
FIG. 10 is a sectional view of still another embodiment in which the countermeasure is applied to the leak magnetic field.

FIG. 10 is a sectional view of still another embodiment in which the countermeasure is applied to the leak magnetic field.

In the embodiment, among two magnets 140a, 140b disposed to hold the carriage 120 therebetween, one magnet 140a directs an N pole to the carriage 120, and the other magnet 140b directs an S pole. When the magnetic poles of two magnets 140a, 140b are disposed in this manner, the magnetic force line of the leak magnetic field extends over the main body 121 of the carriage 120 and connects two magnets 140a, 140b to each other. Therefore, here a yoke 146 is disposed to guide the magnetic force line from one of two magnets to the other along the main body 121, and the leak magnetic field is prevented from turning to the information storage medium.

The leak magnetic field countermeasure shown in FIGS. 8 to 10 can effectively be realized at a low cost, and the information storage apparatus provided with the countermeasure has little error in recording and reproduction. These countermeasures may be employed independently of the devised carriage holding structure described with reference to FIGS. 4 to 7.

Additionally, in the aforementioned embodiment, the magnetic field application portion is independent of the carriage, but the carriage of the present invention may be comprising the magnetic field application portion.

As described above, according to the present invention, the information storage apparatus high in the precision of the recording reproduction position can be realized. Moreover, the information storage apparatus high in the precision of the recording reproduction position is realized, and this largely contributes to rapid enhancement of the recording density of the information storage apparatus.

What is claimed is:

1. An information storage apparatus for performing at least information reproduction via a carriage moving along a predetermined information storage medium with respect to the information storage medium, said information storage apparatus comprising:

a rail extending along said information storage medium, wherein said carriage comprises three or more support members for supporting the carriage with respect to said rail, and a slider for contacting or approaching the surface of said information storage medium, and both a gravity center of the carriage and an application point of a force received by said slider by contacting or approaching the surface of said information storage medium exist inside a polygon whose respective vertexes are formed by said support members as seen from the information storage medium.

2. The information storage apparatus according to claim 1, further comprising an actuator for driving said carriage along said rail, wherein when a height is defined by a distance from the surface of said information storage medium, the height of a position obtained by weighting and averaging respective positions using friction resisting forces generated in respective positions of said support members contacting said rail as weights, the height of the gravity center of said carriage, and the height of the application point of a driving force of said actuator applied to said carriage are the same height.

3. A carriage comprising:

a slider for contacting or approaching a predetermined information storage medium surface; and three or more support members for supporting the carriage, wherein both an application point of a force received by said slider by contacting or approaching the information storage medium surface, and a gravity center of the carriage exist inside a polygon whose respective vertexes are formed by said support members as seen from the information storage medium.

* * * * *